United States Patent
Elmer, II et al.

(10) Patent No.: US 7,784,690 B1
(45) Date of Patent: Aug. 31, 2010

(54) MOBILE DEVICE APPLICATION FOR MANAGING MEDIA AND MEDIA DEVICES

(75) Inventors: William N. Elmer, II, Sanford, FL (US); Mark W. Harris, Orlando, FL (US)

(73) Assignee: Symantec Operating Corporation, Mountain View, CA (US)

( * ) Notice: Subject to any disclaimer, the term of this patent is extended or adjusted under 35 U.S.C. 154(b) by 130 days.

(21) Appl. No.: 11/513,810

(22) Filed: Aug. 31, 2006

(51) Int. Cl.
G06F 19/00 (2006.01)

(52) U.S. Cl. .............. 235/385; 235/375; 235/462.01; 235/462.45; 235/462.46

(58) Field of Classification Search ........... 235/375, 235/385, 454, 451, 492, 462.01, 462.45, 235/462.46
See application file for complete search history.

(56) References Cited

U.S. PATENT DOCUMENTS

| | | | |
|---|---|---|---|
| 5,303,214 A * | 4/1994 | Kulakowski et al. | 369/30.3 |
| 5,426,284 A * | 6/1995 | Doyle | 705/28 |
| 5,455,409 A * | 10/1995 | Smith et al. | 235/385 |
| 5,729,464 A * | 3/1998 | Dimitri | 700/215 |
| 5,963,134 A * | 10/1999 | Bowers et al. | 340/572.1 |
| 6,070,793 A * | 6/2000 | Reichl et al. | 235/375 |
| 6,100,788 A * | 8/2000 | Frary | 340/10.1 |
| 6,466,990 B2 * | 10/2002 | Frary | 719/310 |
| 6,523,749 B2 * | 2/2003 | Reasoner et al. | 235/462.25 |
| 6,710,962 B1 * | 3/2004 | Caverly et al. | 360/69 |
| 7,051,327 B1 * | 5/2006 | Milius et al. | 717/177 |
| 7,145,460 B1 * | 12/2006 | Wojciechowski et al. | 340/572.8 |
| 7,229,021 B2 * | 6/2007 | Vesikivi et al. | 235/462.01 |
| 7,659,820 B2 * | 2/2010 | Schnee et al. | 340/572.1 |
| 2002/0084324 A1 * | 7/2002 | Johnson et al. | 235/385 |
| 2002/0169698 A1 * | 11/2002 | Chien | 705/28 |
| 2002/0180588 A1 * | 12/2002 | Erickson et al. | 340/10.2 |
| 2003/0033224 A1 * | 2/2003 | Ludwig et al. | 705/28 |
| 2004/0153379 A1 * | 8/2004 | Joyce et al. | 705/28 |
| 2005/0021524 A1 * | 1/2005 | Oliver | 707/100 |
| 2005/0133583 A1 * | 6/2005 | Tada | 235/375 |
| 2006/0022814 A1 * | 2/2006 | Nogami et al. | 340/505 |
| 2006/0202032 A1 * | 9/2006 | Kricorissian | 235/435 |
| 2006/0229895 A1 * | 10/2006 | Kodger, Jr. | 705/1 |
| 2007/0055686 A1 * | 3/2007 | Findlay et al. | 707/102 |
| 2007/0296581 A1 * | 12/2007 | Schnee et al. | 340/572.1 |

OTHER PUBLICATIONS

LXI Corp., Tape Tracker: Features at A Glance, 2006, 1 page, http://www.lxicorp.com/solutions/tape_tracker.html.

(Continued)

Primary Examiner—Daniel A Hess
Assistant Examiner—Paultep Savusdiphol
(74) Attorney, Agent, or Firm—Campbell Stephenson LLP

(57) ABSTRACT

A system, method and apparatus for maintaining the location of a removable data medium once that removable data medium has been taken off-line is provided. Such a capability is provided by a mobile device that includes a data transmission mechanism configured to transmit the identity of a data medium and an identity of the location of that data medium. The transmission from the mobile device is received by a web service module that provides the data medium identity and the identity of the location of the data medium to a data store. In one embodiment, the data store comprises an identification of each of a plurality of data media, the status of each of the data media indicating whether that data medium is on or off-line, and if off-line the identity of the location of the off-line data medium.

21 Claims, 6 Drawing Sheets

OTHER PUBLICATIONS

LXI Corp., M7100 Wireless Handled Scanner, 2006, 1 page, http://www.lxicorp.com/solutions/wireless_handled_scanner.html.

B & L Associates, Vertices Product Information, 2006, 10 pages, http://www.vertices.net/product-info/index.asp.

* cited by examiner

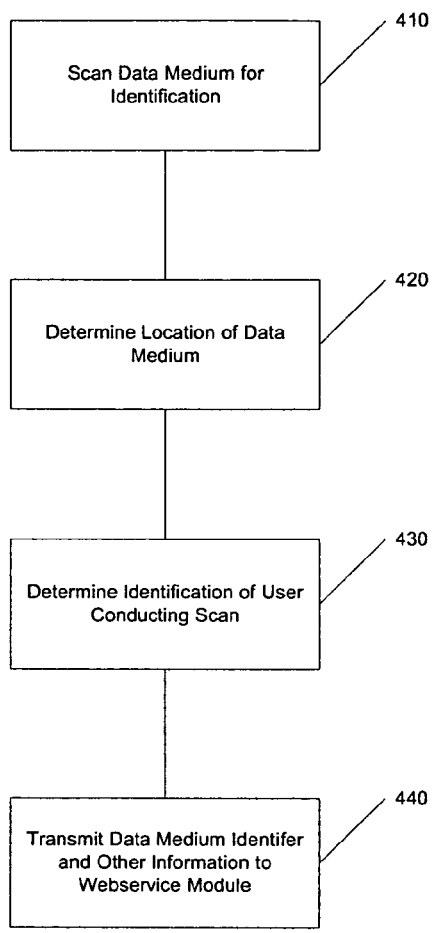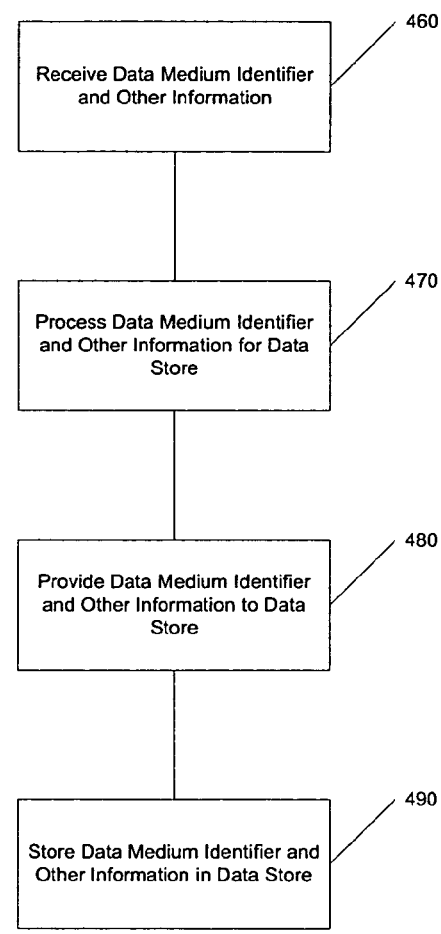
Figure 4a
Figure 4b

MOBILE DEVICE APPLICATION FOR MANAGING MEDIA AND MEDIA DEVICES

FIELD OF THE INVENTION

The field of this invention relates to data storage systems. Specifically, a system, method and apparatus is presented to track removable storage media after the removable storage media has been moved off-line.

BACKGROUND OF THE INVENTION

The ready ability for a business to store, process and to transmit data is a facet of operations that a business relies upon to conduct its day-to-day activities. For businesses that maintain sensitive and confidential information, an inability to protect that data can hurt a business' reputation and bottom line, and expose the business to legal liability. Businesses are therefore taking measures to improve their ability to protect confidential data.

One mechanism that businesses use to protect data is to periodically back up data from online storage to a removable data medium that can be taken off-line and moved to a physically separate location from the system that created the backup. Storing removable data media in a physically separate location from the backup system can protect the data stored thereon from a single destroying event, such as a fire or a flood. To provide additional protection for the data, a business may opt to store that data offsite in a secure tape repository.

While storing data on removable data media in a remote location can protect that data from a single failure event, storage and transportation of the removable data media can expose the removable media to a variety of insecure environments and environments not under the direct control of the business. Such environments include when the data media is transported from one location to another within the business or to an off-site storage location. In addition, the data media may be stored in a variety of locations within the business. Movement and temporary storage of the data media can result in the data media being mislaid or stolen. Such events can happen, in part, because the removable media cannot be adequately tracked by system administration once that removable media is taken to an off-line state.

FIG. 1 is a simplified block diagram of a network system incorporating a removable data media for data storage. Removable data media is accessible to a processor 120 through the use of an autoloader 110. Autoloader 110 houses a set of removable data media 112 (e.g., tape cartridges or optical media). Loading mechanism 114, such as a robotic arm, is used to move a specified removable data media 112 from its storage location in the autoloader to a drive mechanism 116 configured to write and read data to and from the media at the request of processor 120. Autoloader 110 also incorporates a portal 118 that allows a removable media 112 to be removed from the autoloader or to be inserted into the autoloader.

Autoloader 110 is coupled to processor 120 that is configured to transmit and receive data from the autoloader. Processor 120 can include a backup utility module 125 that can manage backups of a variety of data volumes coupled to processor 120 (e.g., directly or indirectly coupled volumes 132 and 134, and network attached storage volumes 142 and 144 coupled to the processor via network 140). Backup utility module 125 can also store information regarding backups that have been performed in a backup data store 150, which can include the identity of a removable data media on which a backup has been stored.

While a removable media 112 is within autoloader 110, that removable data media is available to backup utility module 125 and its location is known. But once a removable data media is removed from the autoloader through portal 118, the backup utility module can no longer automatically track the location of that removable media. In one prior art system, an administrator can access backup utility 125 via a terminal 160 to provide information about the location of a removable data medium, but such information may be out of date by the time that information has been entered (e.g., the data media may have been moved to a new location). Further, requiring an administrator to enter information about where a removable data medium is located consumes administration resources that could otherwise be used more effectively.

It is therefore desirable to have a system that can automatically provide a location of an off-line removable media in order to decrease the burden of entering such information on system administrators as well as improving the security of the removed media.

SUMMARY OF THE INVENTION

The present invention provides, in one embodiment, a system, method and apparatus for maintaining the location of a removable data medium once that removable data medium has been taken off-line. Such a capability may be provided by a mobile device that includes a data transmission mechanism configured to transmit the identity of a data medium and an identity of the location of that data medium. The transmission from the mobile device can be received by a web service module that provides the data medium identity and the identity of the location of the data medium to a data store. In one embodiment, the data store comprises an identification of each of a plurality of data media, the status of each of the data media indicating whether that data medium is on or off-line, and if off-line the identity of the location of the off-line data medium.

In one embodiment of the present invention, the mobile device can further include a scanner which is configured to determine the identity of the data medium. In one aspect of that embodiment, the scanner can be an optical bar code reader configured to read a bar code associated with the data medium. In another aspect of the above embodiment the scanner can be an RFID reader configured to read an RFID chip associated with the data medium.

In another aspect of the present invention, the data transmission mechanism can be a wireless data transmission mechanism. In a further aspect of the present invention, the data transmission mechanism can be configured to perform a USB transmission.

In another aspect of the present invention, the mobile device can be configured to provide a user interface to administrative functions related to the data medium, wherein such administrative functions can include responding to a message from a removable data media access device (e.g., an autoloader) and can monitor the status of the removable data medium access device.

In a further aspect of the present invention, the mobile device can be configured to provide the identity of a user of the mobile device wherein the user's identity can be associated with the data medium identity and the identity of the location of the data medium. In another aspect of that embodiment of the present invention the data store can further comprise the user identity if the data medium is off-line. In a further aspect of that embodiment of the present invention, the mobile device can provide a user interface configured to receive a signature and that signature can be associated with the data medium identity and the identity of the location of the data medium.

In another embodiment of the present invention, a backup agent can be coupled to the web service module and that data store. The backup agent can be configured to receive the data medium identity and the location of the data medium and to store the data medium identity and the location of the data medium in the data store. In one aspect of the embodiment, the backup agent can be further configured to manage backup tasks of data volumes associated with the backup agent, including writing data to the removable data media or reading data from the removable data media. In a further aspect of the above embodiment, the backup agent can provide information regarding the data medium in response to a request for information wherein such information can include the status of the data medium, location of the data medium, the identity associated with the data medium of a user of a mobile device, and a signature associated with the data medium.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 4a is a flow diagram illustrating a method performed for identifying data, in accord with an embodiment of the present invention.

FIG. 4b is a flow diagram illustrating a method performed for processing identifying data, in accord with one embodiment of the present invention.

DETAILED DESCRIPTION

The present invention provides a mechanism for updating an online data store with information about a location of a removable data medium once the data medium has been taken off-line (e.g., removed from an autoloader providing the removable data medium). A device is provided that can be used to identify a removable media and to associate that removable media with a current location. As an aide to identifying the removable medium, the portable device can be equipped with an optical or radio frequency ID (RFID) scanner to read the identity of the removable medium. The portable device can also be provided with a user interface that permits interaction with a system controlling a removable media autoloader or a backup utility module.

The device can be configured to communicate with a data store that can retain the information regarding the removable medium. The data store is also accessible to the backup utility module which is configured to use the information in the data store in performing backups of online data volumes and tracking the removable media.

Figure 1:
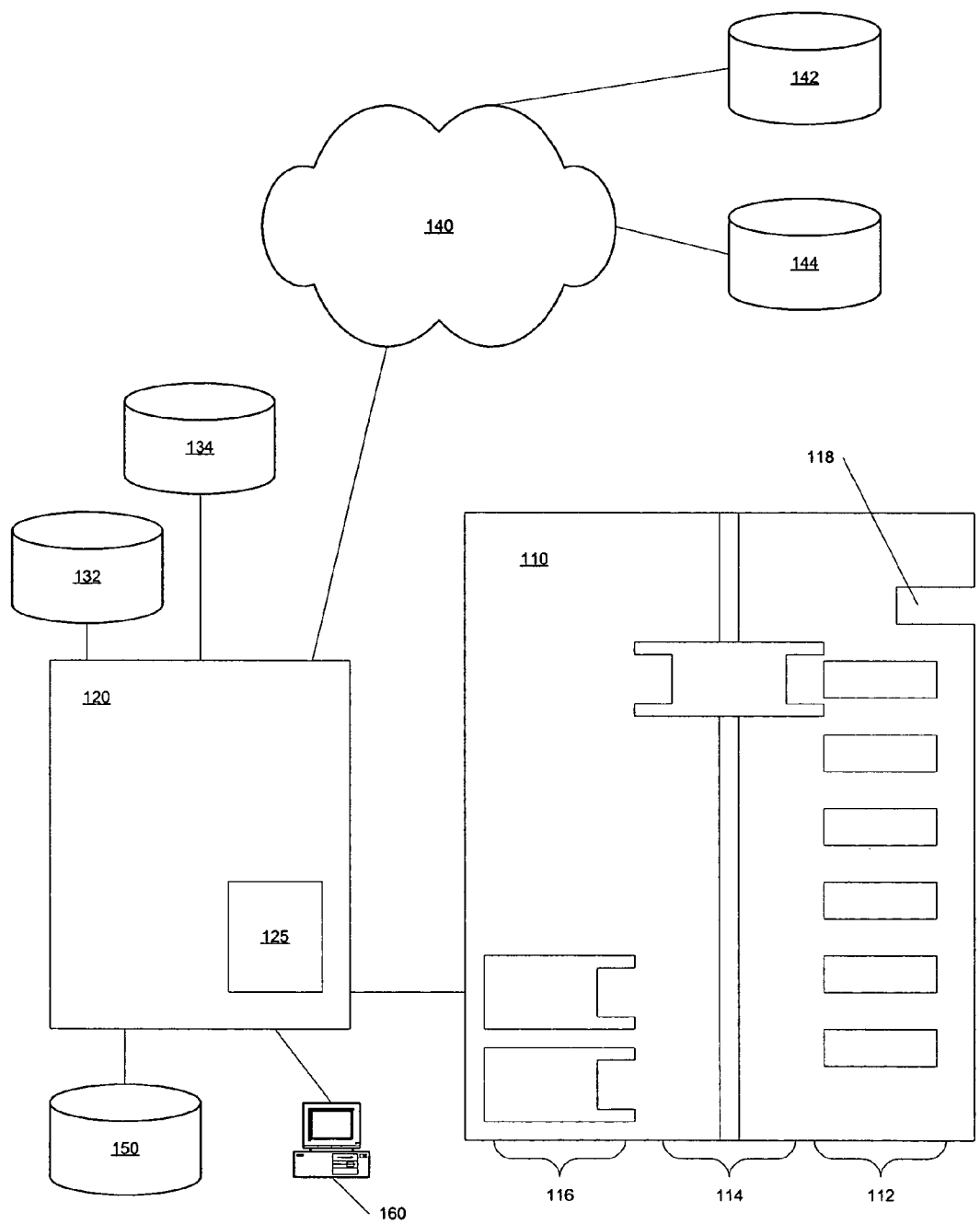
FIG. 1 is a simplified block diagram of a network system incorporating a removable data media for data storage.
Figure 2:
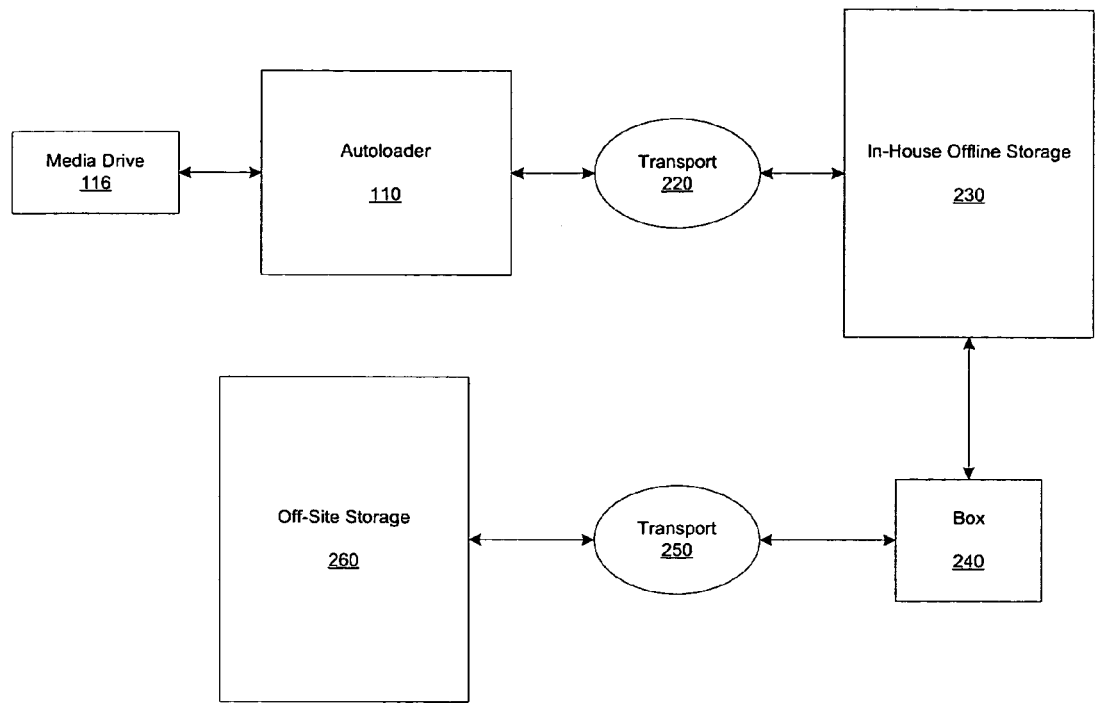
FIG. 2 is a simplified block diagram illustrating a life cycle of a removable data medium that may be tracked by a mechanism in accord with the present invention.

FIG. 2 is a simplified block diagram illustrating a life cycle of a removable data medium that may be tracked by a mechanism in accord with the present invention. Autoloader 110 can provide the removable data medium to drive 116, as discussed in the background section. Once removed from the autoloader the data media can go through a transport stage 220 as the data medium is being transported to an in-house off-line storage area 230. The data medium can be stored for any period of time in the in-house off-line storage area 230 and can be recalled for access to the autoloader by reversing the transport path. Alternatively, the data medium can be inserted into a box 240 and be transported in a second transport stage 250 on the way to an off-site storage 260. Should the data medium be recalled for access, the medium can reverse all or part of the transport path to the autoloader.

Concerns regarding location of the data medium at any of stages 220 through 260 can be alleviated by real-time tracking of the data medium during each stage, as provided by the present invention.

Figure 3:
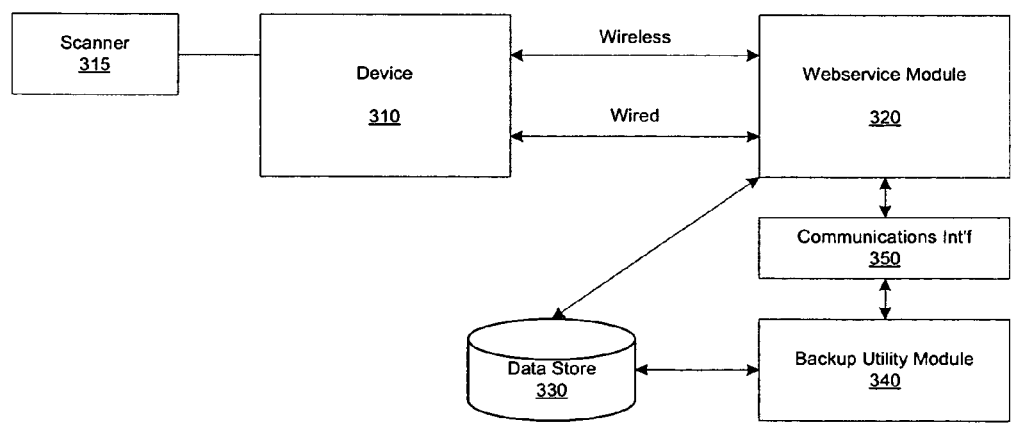
FIG. 3 is a simplified block diagram of a system suitable for implementing an embodiment of the present invention.

FIG. 3 is a simplified block diagram of a system suitable for implementing an embodiment of the present invention. A device 310 can include a means for entering an identification of a removable media as well as determining a present location of the removable media. The device includes a processor to execute software instructions locally as well as a data transmission mechanism to communicate with web service module 320. Data transmission can include wireless communication (e.g., IEEE 802.11) or wired communications (e.g., Ethernet, serial connections, or USB).

In one embodiment, device 310 is a portable device such as a personal digital assistant (PDA), or a laptop or notebook computer, having a graphical user interface permitting a user to enter information such as the data medium identification, an identification of the user of the PDA, and the identification of the location of the removable medium. Device 310 can also be coupled to or contain a scanner 315, which can be used to determine an identification of the data medium. Scanner 315 can be an optical scanner configured to read a bar code or other kind of optical code attached to the removable media or the cover of the removable media. Scanner 315 can also be a radio frequency identification (RFID) scanner configured to read a signal from an RFID tag attached to the removable media or the removable media cover. The RFID scanner can also be configured to query and read RFID tags, for example, attached to a cart used in transport stage 220, located within in-house, off-line storage 230, attached to box 240, attached to transport 250, or located within off-site storage 260, thereby automatically providing a location of the removable medium.

As discussed above, device 310 incorporates a data transmission mechanism configured to provide data associated with the removable medium to a web service module 320. Web service module 320 receives the information via a data reception mechanism and is configured to provide that information to backup data store 330 in a format appropriate for the backup data store. Web service module 320 can also provide the information related to the data medium to a backup utility module via a communication interface 350. Communication interface 350 permits external process communication with backup utility 340, for example through the use of remote procedure calls. Alternatively, a communication interface can be incorporated into web service module 320, thus permitting a direct communication from web service module 320 to backup utility module 340.

Web service module 320 includes protocol modules used in facilitating the communication path between device 310 and backup store 330 or backup utility module 340, and vice versa. The facilitated communication path between device 310 and web service module 320 can include, for example, a wireless connection via a local ethernet network incorporating wireless routers, a wireless connection via a wide-area network such as the Internet, and a wireless connection to a wireless router directly coupled to a processor incorporating the protocol modules. The facilitated communication path between web service module 320 and backup store 330 or backup utility module 340 can include, for example, remote procedure calls using a network connection or a direct connection. Web service module 320 can also facilitate communication between a network connected device, such as a computer executing a web browser, and the backup store or backup utility module.

Through the communication path, backup utility module 340 has access to current location and status information related to the removable medium, including the location of the removable medium and the identification of the person who provided that location (e.g., the user of device 310).

It should be noted, that the communication paths illustrated in FIG. 3 are bi-directional. Such bi-directional communication permits a user of device 310 to perform administrative tasks related to the removable media, as required. For example, autoloader 110 may require user input to open portal 118 to either remove or insert an item of removable media. Additionally, device 310 can provide a status report of media within autoloader 110 or transport mechanism 114 or drives 116 (e.g., whether a medium is active in a drive, the number of media in the autoloader, and whether there are alerts related to an autoloader that need a response). Bi-directional communication can also permit device 310 to query the data store for information about where a specified removable media is located, or what removable media is stored within a specified location. It should be appreciated that a wide variety of administrative tasks and information can be provided by device 310 through the illustrated communication, and such administrative tasks are not limited to the specific items discussed herein.

It should also be noted that while device 310 has been described as a "portable" device such as a PDA, the identification tasks discussed with regard to FIGS. 3, 4a and 4b can also be performed by a non-portable device, for example, a personal computer, a work station, or terminal installed in a particular location.

FIG. 4a is a flow diagram illustrating a method performed by device 310 for identifying data. Initially, the data medium can be scanned for its identity (410). The scan can include an optical scan, such as a bar code reader, or an RFID scan. Alternatively, the identification of the data medium can be manually entered by a user of device 310. The device can then determine a location of the data medium (420). A determination of the location can be performed, for example, either through user input or an RFID scan. An identification of an individual to be associated with locating the data medium in the location is then determined (420). Such an identification can be, for example, the identification of the user of the device (e.g., a login identifier), or a signature entered into a portable device through a graphical user interface. The device can then transmit the data medium identification and other information to a web service module (440). As discussed above, the data transmission can be performed either wirelessly or through a cabled connection.

FIG. 4b is a flow diagram illustrating steps that can be performed by a combination of web service module 320, data store 330 and backup utility module 340, in accord with one embodiment of the present invention. The data medium identification and other information is received by web service module 320 (460). The data medium identification and other information is then processed into a form appropriate for the data store (470). The processed data medium identification and other information is provided to the data store (480). Alternatively, step 470 can process the data medium identification and other information to a form useable by backup utility module 340 or another media management utility, which can then further process the information and provide the information to the data store. Ultimately, the data medium identification and other information is stored in the data store (490).

Data store 330 can be implemented as a database accessible to backup utility module 340. Use of a database to store such information provides flexibility in relating the various pieces of information to one another. For example, each location at which a data medium can reside can be associated with a separate table within the database identified as a "vault." As a data medium is moved from one location to another, the data medium identification may be removed from the vault corresponding to the data medium's previous location and moved to the vault corresponding to the data medium's current location. Each vault can store any number of data medium identifiers corresponding to data media residing in the physical location corresponding to the vault.

Information stored in the data store can then be accessed by backup and system administrators, as needed, to determine the current location and status of any piece of removable media associated with the system.

Figure 5:
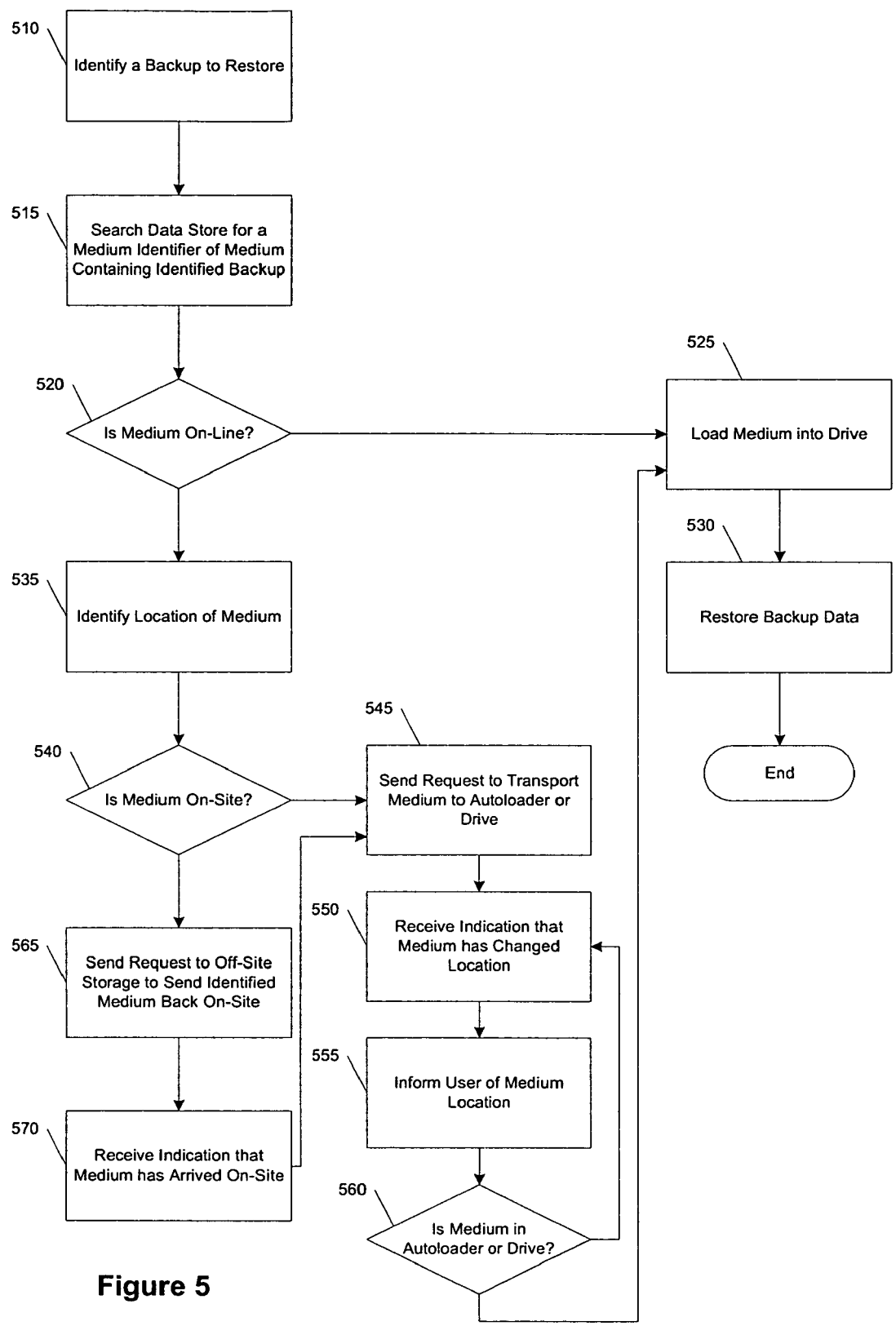
FIG. 5 is a flow diagram illustrating a process that can be performed in restoring a backup from a removable medium, in accord with one embodiment of the present invention.

FIG. 5 is a flow diagram illustrating a process that can be performed by the backup utility module in restoring a backup from a removable medium, in accord with one embodiment of the present invention. Initially, a backup can be identified for restoration (510). The identity of the backup can be determined by, for example, date, time, and volume of the backup. The data store can then be analyzed for an identifier of the removable medium to which the identified backup was written, as well as information regarding on-line status of the identified removable medium (515).

If the medium is on-line (520), then the backup utility module can signal an autoloader containing the medium to load the medium into a drive for access or signal a single drive to load the medium (525). The backup utility module can then restore the required backed-up data (530).

If the medium is not on-line (520), then the backup utility module can determine the identification of the location of the medium from the data store (535). If the medium is on-site (e.g., on-site storage or in an on-site transport) (540), then the backup utility module can send a request to transport the removable medium to an autoloader or drive (545). Such a request can be transmitted, for example, via electronic mail or via the communication path described herein between the backup utility module 340 and device 310. A person responsible for media location can locate the requested medium and enter a change in location of the medium using device 310, which can be received by the backup utility module (550). The backup utility module can inform the user who requested the medium that the location of the medium has been changed (555). If the medium location does not show the medium in an autoloader or drive, then the backup utility module can continue to update the requesting user with the removable medium location as it changes from place to place (560). Once the removable medium arrives at the autoloader or drive, the backup utility can signal that the medium is to be loaded into a drive (525) and commence restoring the backup (530).

If the off-line medium is off-site (540), then a request can be sent to an administrator of the off-site storage facility to send the requested medium back on-site (565). Such a message can be sent, for example, via electronic mail, wireless communication to a device 310, or another predetermine mode of communication between the backup utility module and the off-site storage facility. The backup utility module can receive an indication that the medium has arrived on-site (570) and the process can then proceed as indicated above for an on-site medium (e.g., 545-560), tracking the medium on its path to a drive.

An Example Computing And Network Environment

As shown above, the present invention can be implemented using a variety of computer systems and networks. An example of one such computing and network environment is described below with reference to FIGS. 6 and 7.

Figure 6:
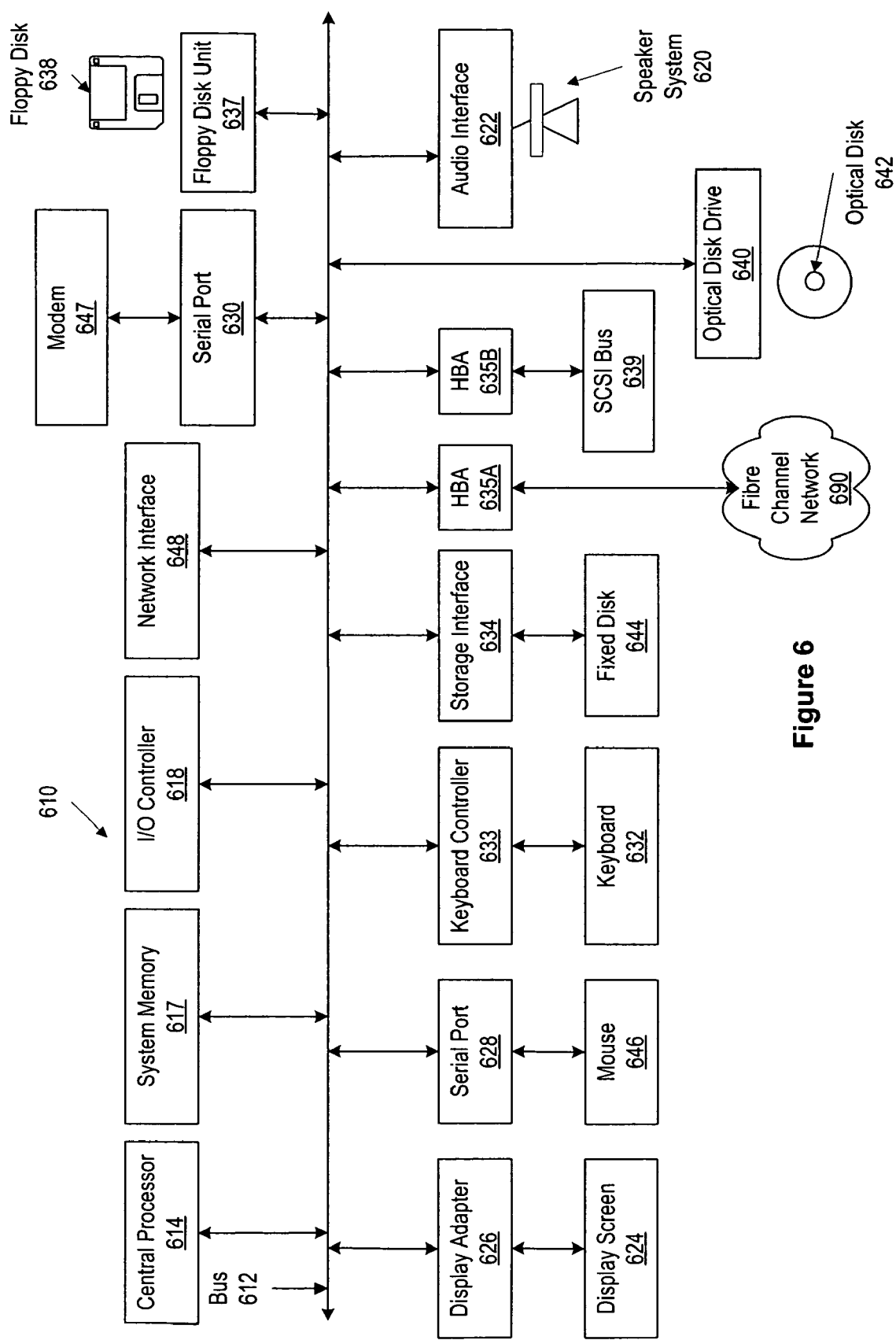
FIG. 6 depicts a simplified block diagram of a computer system suitable for implementing embodiments of the present invention.

FIG. 6 depicts a block diagram of a computer system 610 suitable for implementing the present invention. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a fibre channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium such as removable media in an autoloader 110. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an interne service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present invention. The devices and subsystems can be interconnected in different ways from that shown in FIG. 6. The operation of a computer system such as that shown in FIG. 6 is readily known in the art and is not discussed in detail in this application. Code to implement the present invention can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
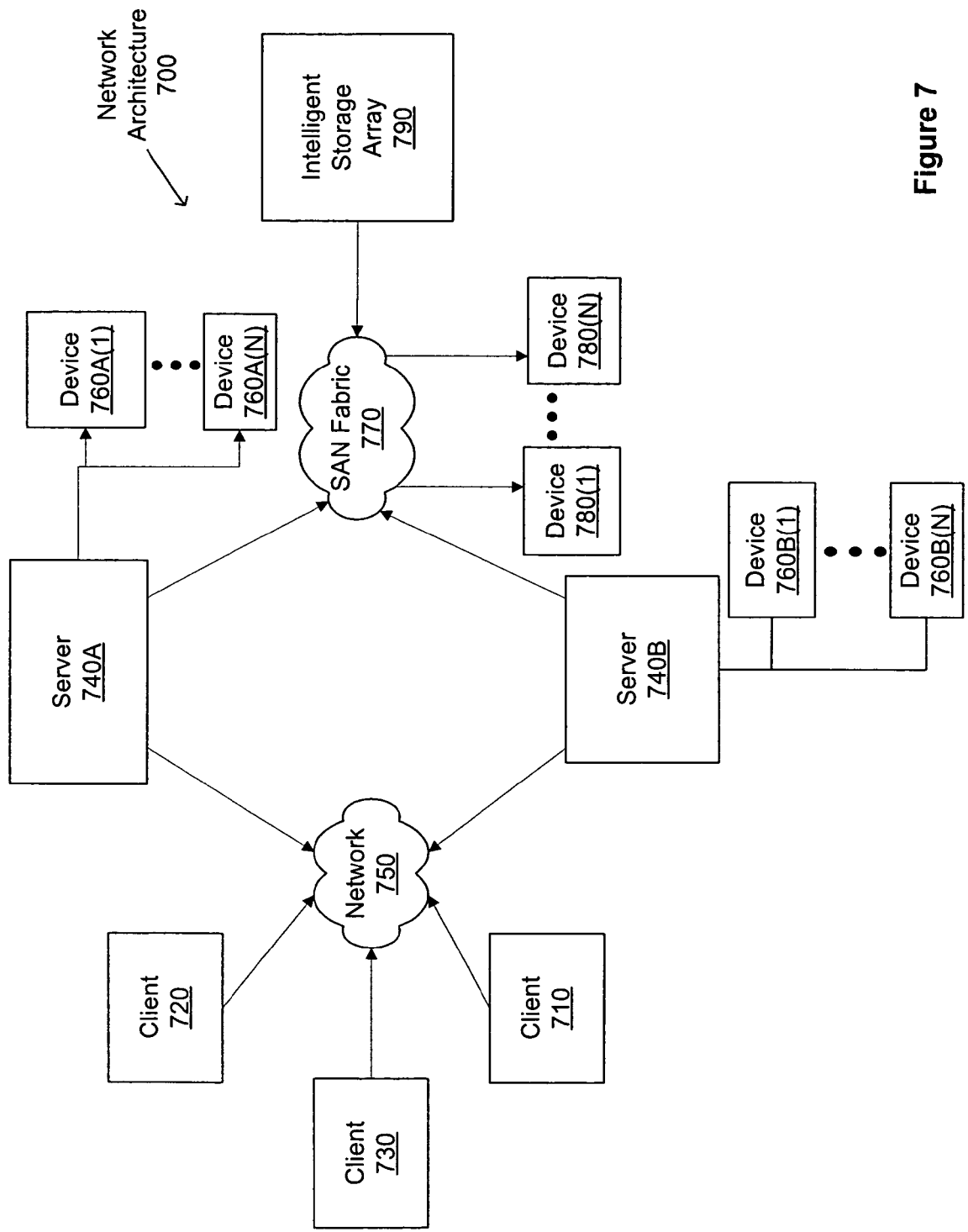
FIG. 7 is a block diagram depicting a network architecture suitable for implementing embodiments of the present invention.

FIG. 7 is a block diagram depicting a network architecture 700 in which client systems 710, 720 and 730, as well as storage servers 740A and 740B (any of which can be implemented using computer system 610), are coupled to a network 750. Storage server 740A is further depicted as having storage devices 760A(1)-(N) directly attached, and storage server 740B is depicted with storage devices 760B(1)-(N) directly attached. Storage servers 740A and 740B are also connected to a SAN fabric 770, although connection to a storage area network is not required for operation of the invention. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720 and 730 to network 750. Client systems 710, 720 and 730 are able to access information on storage server 740A or 740B using, for example, a web browser or other client software (not shown). Such a client allows client systems 710, 720 and 730 to access data hosted by storage server 740A or 740B or one of storage devices 760A(1)-(N), 760B(1) 780 (1)-(N) or intelligent storage array 790. FIG. 7 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 610). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A system comprising:
   a mobile device comprising
      a user interface to administrative functions related to a data medium, wherein
         the administrative functions are selected in response to user input, and
         the administrative functions comprise removing the data medium by an autoloader and inserting the data medium by the autoloader,
      a scanner configured to determine a data medium identity, and
      a data transmission mechanism configured to transmit the data medium identity of a data medium and an identity of a location of the data medium, wherein the identity of the location of the data medium comprises an identity of a transport stage when the data medium is at the transport stage;
   a web service module configured to
      receive, from the mobile device, the data medium identity and the identity of the location of the data medium, and
      provide the data medium identity and the identity of the location of the data medium to a data store; and
   the data store comprising
      identities of each of a plurality of data media,
      status of a first of the plurality of data media, wherein
         the status indicates whether the first of the plurality of data media is off-line, and
      the identity of the location of the first of the plurality of data media, if the first of the plurality of data media is off-line.

2. The system of claim 1 wherein the scanner comprises:
   an optical bar code reader configured to read a bar code associated with the data medium.

3. The system of claim 1 wherein the scanner comprises:
   an RFID reader configured to read an RFID chip associated with the data medium.

4. The system of claim 1 wherein the data transmission mechanism is further configured to perform wireless transmission of the data medium identity and the identity of the location of the data medium.

5. The system of claim 4 wherein the web service module is further configured to receive the wireless transmission of the data medium identity and the identity of the location of the data medium.

6. The system of claim 1 wherein the data transmission mechanism is further configured to perform USB transmission of the data medium identity and the identity of the location of the data medium.

7. The system of claim 6 wherein the web service module is further configured to receive the USB transmission of the data medium identity and the identity of the location of the data medium.

8. The system of claim 1 wherein the mobile device is further configured to:
query the data store for information for display on the user interface, wherein
the information comprises one or more of
an identity of a location of a specified removable media, and
an identification of removable media stored in a specified location.

9. The system of claim 8 wherein the administrative functions further comprise:
responding to a message from a data medium access device.

10. The system of claim 8 wherein the administrative functions further comprise:
monitoring a status of a data medium access device.

11. The system of claim 1 wherein the data transmission mechanism is further configured to:
transmit an identity of a user of the mobile device, wherein
the user identity is associated with the data medium identity and the identity of the location of the data medium.

12. The system of claim 11 wherein the data store further comprises:
the user identity, if the data medium is off-line.

13. The system of claim 1 wherein the mobile device is further configured to:
provide a user interface configured to receive a signature; and
the data transmission mechanism is further configured to transmit the signature, wherein the signature is associated with the data medium identity and the identity of the location of the data medium.

14. The system of claim 13 wherein the data store further comprises:
the signature, if the data medium is off-line.

15. The system of claim 1 further comprising:
a backup module, coupled to the web service module and the data store, configured to receive the data medium identity and the location of the data medium, and store the data medium identity and the location of the data medium in the data store.

16. The system of claim 15 wherein the backup module is further configured to:
manage backup tasks of data volumes associated with the backup module, wherein
the backup tasks comprise writing a first backup to a first of the plurality of data media, and reading a second backup from a second of the plurality of data media.

17. The system of claim 15 wherein the backup module is further configured to:
provide information regarding the data medium, in response to a request for the information, wherein
the information comprises one or more of the status of the data medium, the location of the data medium, the identity associated with the data medium of the user of the mobile device, and a signature associated with the data medium.

18. The system of claim 1 wherein the identity of the location of the data medium further comprises an identity of an off-site storage location when the data medium is at the off-site storage location.

19. A method comprising:
receiving, from a mobile device, a data medium identity and an identity of a location of the data medium, wherein
the identity of the location of the data medium comprises an identity of a transport stage when the data medium is at the transport stage;
providing the data medium identity and the identity of the location of the data medium to a data store, wherein
the data medium identity is determined by a scanner coupled to the mobile device, and
the data store comprises identities of each of a plurality of data media, status of a first of the plurality of data media, and an identity of the location of the first of the plurality of data media if the first of the plurality of data media is off-line, wherein
the status indicates whether the first of the plurality of data media is off-line; and
querying, by the mobile device, the data store for information for display on a user interface, wherein
the user interface is configured to provide administrative functions related to the data medium,
the administrative functions are selected in response to user input,
the administrative functions comprise removing the data medium by an autoloader and inserting the data medium by the autoloader, and
the information comprises one or more of
an identity of a location of a specified removable media, and
an identification of removable media stored in a specified location.

20. The method of claim 19 further comprising:
receiving an identity of a user associated with the data medium identity and the identity of the location of the data medium; and
providing the identity of the user to the data store, wherein
the data store further comprises the identity of the user if the data medium is off-line, and
the identity of the user is associated in the data store with the data medium identity and the identity of the location.

21. The method of claim 19 further comprising:
accessing the data store in response to a request for information regarding the data medium; and
providing the information in response to the request, wherein
the information comprises one or more of the status of the data medium, the location of the data medium, the identity of the user associated with the data medium, and a signature associated with the data medium.

* * * * *